Oct. 19, 1937.   T. N. PIERSON ET AL   2,096,558
SICKLE DRIVING MECHANISM FOR HARVESTING MACHINES
Filed June 26, 1936   3 Sheets-Sheet 1

INVENTORS
Torvald N. Pierson, and
Gene Allen
BY
ATTORNEY

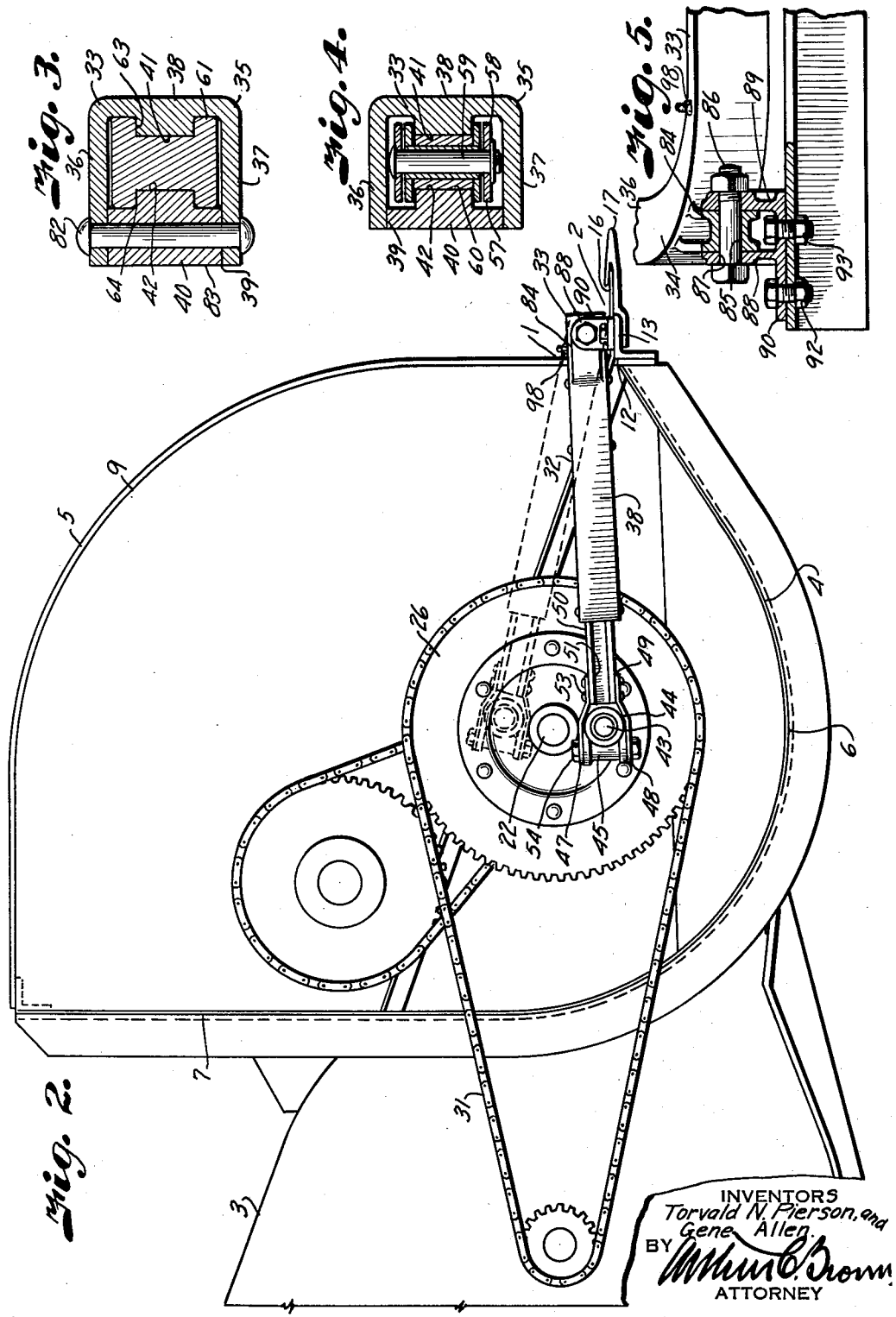

Oct. 19, 1937.                    T. N. PIERSON ET AL                    2,096,558
                    SICKLE DRIVING MECHANISM FOR HARVESTING MACHINES
                          Filed June 26, 1936            3 Sheets-Sheet 3
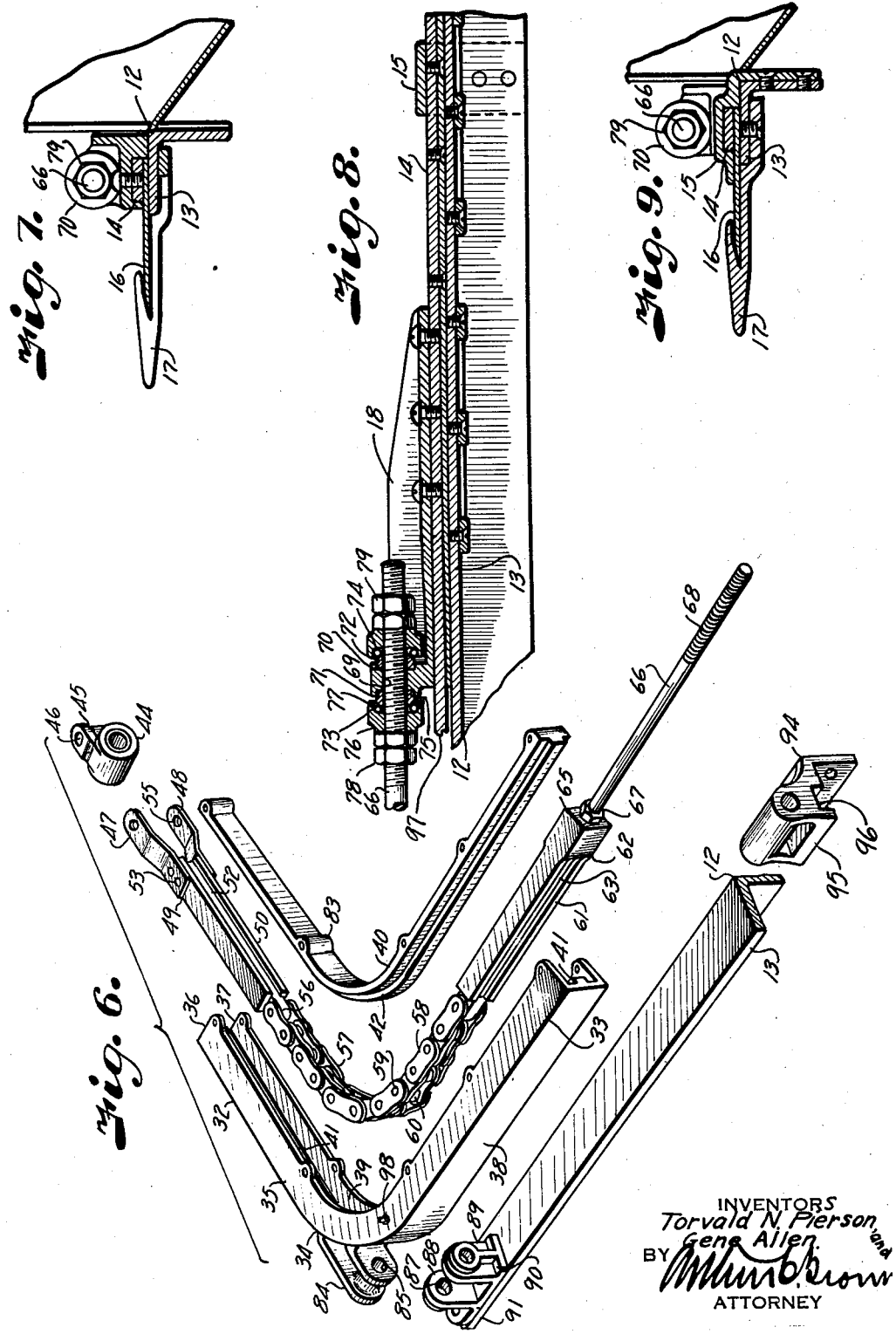
INVENTORS
Torvald N. Pierson, and
Gene Allen
BY
ATTORNEY Patented Oct. 19, 1937

2,096,558

UNITED STATES PATENT OFFICE 2,096,558

SICKLE DRIVING MECHANISM FOR HARVESTING MACHINES

Torvald N. Pierson and Gene Allen, Independence, Mo., assignors to Gleaner Harvester Corporation, Independence, Mo., a corporation of Delaware Application June 26, 1936, Serial No. 87,456

16 Claims. (Cl. 56—296)

This invention relates to harvesting machines of the combine type and particularly to a sickle driving mechanism therefor. In machines of this character power for actuating the sickle is usually transmitted from a shaft located on the side of the threshing unit and having its axis of rotation extending parallel with the sickle. It is, therefore, necessary to provide a connection whereby rotary motion of the shaft is transformed to a reciprocatory motion for the sickle, and the driving connection must be constructed to carry the motion around the forward end of the thresher. On small combines this is a difficult problem owing to the weight of the conventional parts and short distances in which the change in motions must be effected.

It is, therefore, a principal object of the present invention to provide a simple, light weight driving mechanism for transforming the rotary motion of the actuator to a reciprocating motion for driving the sickle.

Another important object of the invention is to provide a sickle driving mechanism having a minimum number of parts to not only reduce friction and wear but to prevent lost motion and provide smoother action of the sickle.

In accomplishing these and other objects of the invention, as hereinafter pointed out, we have provided improved details of structure, the preferred form of which is illustrated in the accompanying drawings wherein:

Fig. 2 is an end elevational view of the portion of the combine shown in Fig. 1.

Fig. 3 is a cross-section on the line 3—3 of Fig. 1.

Fig. 4 is a similar view on the line 4—4 of Fig. 1.

Fig. 5 is a detail section through the pivotal mounting of the driving connection.

Fig. 6 is a detail perspective view of the parts of the driving connection which are shown in disassembled spaced relation to better illustrate their construction.

Fig. 7 is a section through the sickle on the line 7—7 of Fig. 1.

Fig. 8 is a longitudinal section through the driving head of the sickle bar particularly illustrating the adjustable anchorage of the driving connection therewith.

Fig. 9 is a cross-section on the line 9—9 of Fig. 1.

Figure 1:
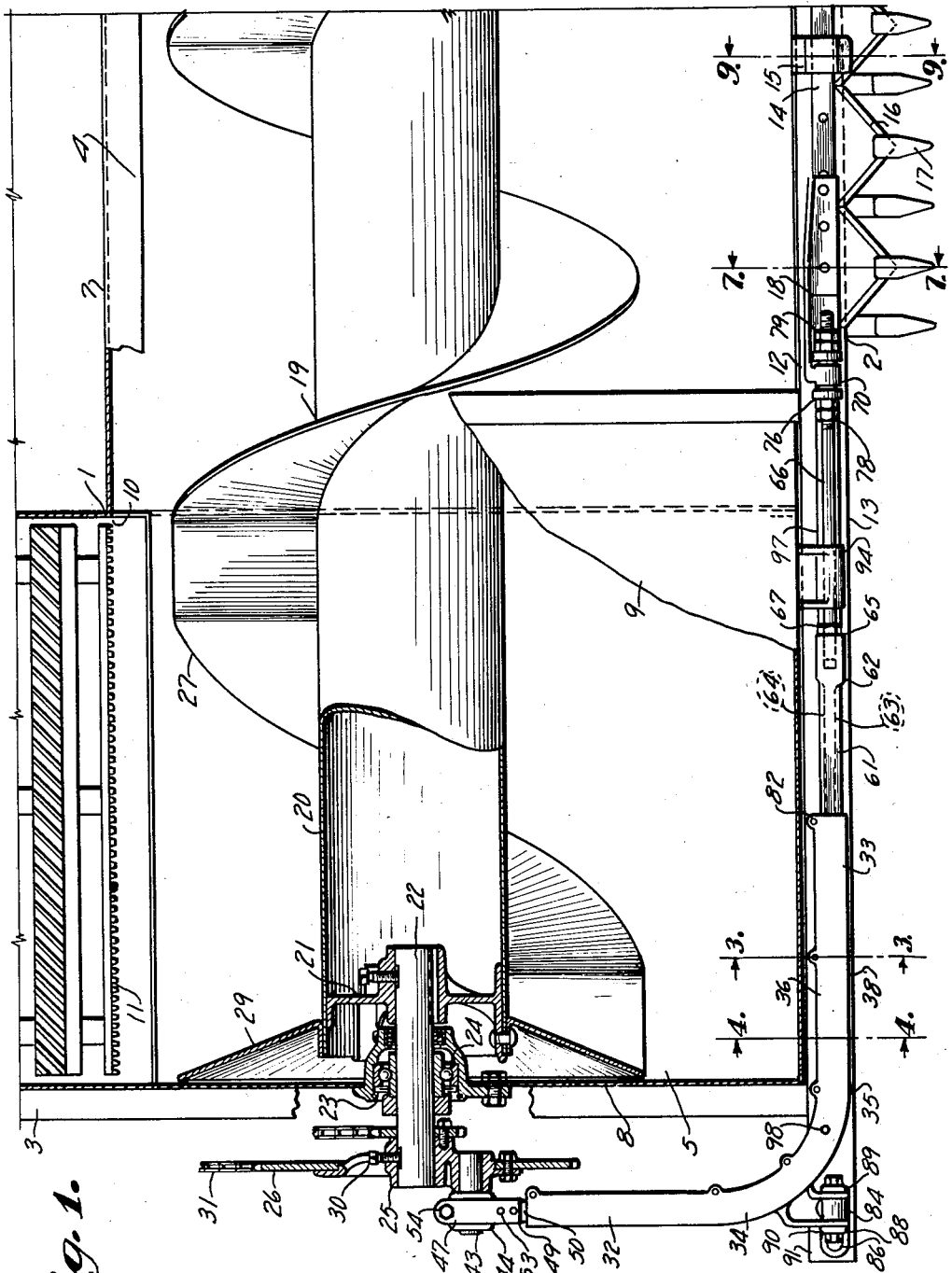
Fig. 1 is a plan view partly in section of a portion of a combine equipped with a sickle driving mechanism embodying the features of the present invention.

Referring more in detail to the drawings:

1 designates a combine including a harvesting unit 2 for cutting grain and delivering the grain to a threshing unit 3 from where the threshed grain is delivered to a separator unit (not shown), as in conventional combine practice. The harvesting unit 2 includes a trough-shaped conveyor pan 4 extending transversely of the threshing unit and connected therewith by a feeder housing 5, the lower portion 6 and back board 7 of which form a continuation of the corresponding parts of the pan while the outer end and top thereof are closed by an end wall 8 and a rounded cover 9 extending from the forward edge of the pan to the top of the back board 7 as clearly shown in Fig. 2.

The back portion of the feed housing has an opening 10 therein communicating with the threshing unit 3 and in which is mounted the usual threshing cylinder 11. Fixed to and extending along the forward edge of the pan and continuing across the front of the feeder housing is an angle bar 12 arranged to provide a forwardly extending flange 13 over which the knife back 14 of the sickle is reciprocably mounted in suitable guides 15. The knife back extends from substantially adjacent the open side of the feed housing to the opposite end of the conveyor pan and is provided with conventional cutter blades 16 that are movable over guard teeth 17 also fixed to the flange 13 of the angle bar 12. Secured to the knife back 14 on the end adjacent the feeder housing is a head 18 which is connected to the actuating mechanism for reciprocating the sickle as later described.

Rotatably mounted in the pan and having an end thereof extending into the feeder housing is a screw type conveyor 19 whereby grain cut with the sickle is fed along the pan into the feeder housing and discharged from the feeder housing into the threshing cylinder. The conveyor includes a tubular shaft 20 having inset hubs 21 fixed within the ends thereof to mount stub shafts 22 that are journalled in suitable bearings 23 at the ends of the conveyor. The bearing at the feeder end of the shaft is mounted in the end wall 8 and includes an antifriction bearing 24 to rotatably mount the stub shaft 22 at that end of the conveyor, the stub shaft extending through the bearing a sufficient distance on the outer side of the wall to mount the hub 25 of a sprocket wheel 26 whereby the conveyor is rotated to cause feed of the grain along the pan and into the feeding chamber from where it is deflected laterally through the opening 10 by means of a deflector 27 formed as a part of the conveyor.

Cooperating with the deflector plate 27 to divert the drain is a substantially truncated cone-shaped disk 29 fixed to the conveyor shaft and having its outer periphery closely moving over the inner face of the wall 8. In the illustrated instance the sprocket wheel 26 is fixed to the stub shaft by means of a set screw 30 or equivalent keying device so that rotation of the sprocket by means of its driving chain 31 drives the stub shaft, thereby actuating the conveyor.

The construction thus far described is illustrative of one form of combine and specifically forms no part of the present invention but is illustrated to show an adaptation of the present invention which includes a driving mechanism connecting the sprocket wheel with the driving head of the sickle and for transforming rotary motion of the sprocket and shaft 22 to a reciprocating motion for driving the sickle, as now to be described.

The driving connection includes a substantially L-shaped housing having leg portions 32 and 33 thereof extending in the direction of the sprocket and sickle respectively and connected by a rounded portion 34. The housing includes a channel shaped section 35 having upper and lower flanges 36 and 37 connected by a vertical wall 38 to leave an open inner side 39 that is normally closed by a cover section 40 conforming in shape to the L-shaped section 35 and of suitable width to snugly engage between the flanges 36 and 37 and cooperate therewith and with the wall 38 to form a substantially tubular guide track for the driving members of the connection. The inner faces of the walls 38 and 40 are provided with inwardly extending ribs 41 and 42 to guidingly retain the driving members as now to be described.

Fixed to and projecting from the hub 25 of the sprocket wheel is a crank pin 43 rotatably mounting a sleeve 44 having a laterally extending lug 45 provided with an opening 46 extending transversely of the crank pin to connect the yoke-shaped straps 47 and 48 of a pitman member 49. The pitman member includes a shank 50 conforming in cross-section to the tubular guide track and having grooves 51 and 52 in the sides thereof to guidingly engage the ribs or tracks 41 and 42. The yoke straps 47 and 48 are fixed to the outer end of the shank by fastening devices such as rivets 53, and the outer ends thereof branch upwardly and rearwardly to straddle the sleeve 44 and connect with the lug 45 by means of a fastening device, such as a bolt 54, extending through the apertures 55 in the ends of the straps and through the opening 46 in the lug as shown in Fig. 2. The pivotal mounting of the connecting rod compensates for any misalignment between the crank pin and the rearwardly extending lug of the housing when the housing is pivotally mounted on the angle bar 12.

Formed on the inner end of the shank is an ear or lug 56 to which is connected one end of a flexible connection 57 extending through the curved portion of the housing. The flexible connection 57 includes a plurality of links 58 connected by pins 59 carrying rollers 60 having rolling contact with the ribs 41 and 42 depending from the direction of movement of the connection. Connected with the opposite end of the flexible connection and slidable within the other leg of the housing is a shank 61 of a guide block 62, the shank 61 having side grooves 63 and 64 engageable with the guide ribs in the same manner as the shank 49. The guide block projects from the housing and has a head 65 to which is connected a rod 66, the rod being threaded into a bore in the head and secured by a jam-nut 67. The rod 66 has its outer end threaded, as at 68, to project through an opening 69 in a lug 70 of the sickle head 18.

Formed in the lug 70 on the opposite sides thereof are bearing recesses 71 and 72 to mount antifriction thrust bearings 73 and 74 respectively. The bearings 73 and 74 include race rings 75 seated in the recesses and rings 76 threaded on the rod and having ball races to cooperate with the race rings in mounting antifriction bearings such as the balls 77. The members 73 and 74 are retained in adjusted position on the rod by means of jam-nuts 78 and 79 to prevent turning thereof on the rod. The housing sections 38 and 40 are secured by suitable fastening devices such as rivets 82, extending through aligning ears on the respective flanges of the housing and through aligning bosses 83 formed as an integral part of the cover section.

The housing carrying the driving connection is pivotally mounted on the angle bar for oscillation incidental to reciprocatory movement of the crank. This is accomplished by providing the housing at the bend thereof with an integral bearing lug 84 having a transverse bearing opening 85 therethrough to mount a pivot pin 86 that extends through openings 87 in the arms 88 and 89 of a bearing bracket 90 in axial alignment with the rod 66, the bearing bracket 90 being attached to a projecting end 91 of the angle bar as best shown in Fig. 1. The bracket is secured to the bar by suitable fastening devices such as bolts 92 and 93 as shown in Fig. 5. Cooperating with the bearing bracket 90 is a similar bearing bracket 94 fixed to the angle bar at a point between the sickle and the leg 33 of the housing, the bracket being spaced relatively thereto to provide for full reciprocatory movement of the driving connection as well as the sickle bar. The bearing bracket includes a flange-like base 95 overlapping the legs of the angle bar as best shown in Fig. 6, and has a recess 96 to accommodate an extension 97 of the knife back which reciprocates therein. The head end of the knife back is, therefore, guidingly retained for reciprocatory movement and there is no tendency for it to rock incidental to oscillatory movement of the rod 66. To lubricate the driving connection the housing is provided with a fitting 98 through which lubricant is injected as in conventional practice. The pivotal connections may be lubricated by suitable oil holes or the equivalent.

Assuming that the parts are constructed and assembled as described, the operation is as follows:

Rotation of the sprocket wheel 26 causes gyration of the wrist pin 43 to effect reciprocatory movement of the pitman so that the shank portion 50 thereof slides within the leg 32 of the housing. Reciprocation of the shank causes the chain to move within the housing to effect sliding movement of the shank 61 of the guide block which in turn slides the rod 66 through the bearing 94 to effect reciprocation of the sickle across the guard teeth. During reciprocation of the driving connection the housing oscillates about the axis of the rod 66 and the pivot bolt 86 to accommodate the throw of the crank. During oscillation of the housing, the rod 66 oscillates or swivels within the opening of the lug 70 on the thrust bearings so that there is substantially no twisting strains applied to the sickle and the sickle is free to reciprocate in cutting relation with the guard teeth. In case any wear should occur, it may be taken up by adjusting the thrust bearings so as to maintain the same relative positions of the sickle blades with the guard teeth.

From the foregoing, it is obvious that we have provided a driving connection which is of light weight and which consists of a minimum number of parts. It is also obvious that the drive is directly applied to the sickle bar so as to reduce the power required.

What we claim and desire to secure by Letters Patent is:

1. In a sickle drive, a crank, a guide housing, a pitman member slidably mounted in the guide housing and connected with the crank, flexible means in the guide housing having connection with the pitman member, means pivotally mounting the guide housing for oscillation to accommodate throw of the crank, and means connecting the flexible means with a sickle.

2. In a sickle drive, a crank, a guide housing, a pitman slidably mounted in the guide housing and connected with the crank, flexible means in the guide housing having connection with the pitman, a guide member slidable in the guide housing and connected with said flexible means, means pivotally mounting the housing for oscillation to accommodate throw of the crank, and swivel means connecting the guide member with a sickle.

3. In a sickle drive, a crank, a guide housing, a pitman member slidably mounted in the guide housing and connected with the crank, flexible means in the guide housing having connection with the pitman member, a guide member slidable in the guide housing and connected with said flexible means, means connecting the guide member with a sickle, and means pivotally mounting the guide housing for oscillation about the axis of the connecting means to accommodate throw of the crank.

4. In a sickle drive, a crank, a guide housing, a pitman member slidably mounted in the guide housing and connected with the crank, flexible means in the guide housing having connection with the pitman member, rollers on said flexible means having rolling bearing in the guide housing, and means connecting the flexible means with a sickle.

5. In a sickle drive, a crank, a guide housing, a pitman member slidably mounted in the guide housing and connected with the crank, a flexible member in the guide housing having connection with the pitman member, means pivotally mounting the guide housing for oscillation to accommodate throw of the crank, means in the guide housing for guiding said members during reciprocatory movement under the propelling influence of the crank, and means connecting the flexible means with a sickle.

6. In a sickle drive, a crank, a guide housing, a pitman member slidably mounted in the guide housing and connected with the crank, flexible means in the guide housing having connection with the pitman member, rollers on the flexible means having rolling support in the housing, a guide member slidable in the guide housing and connecting with said flexible means, means connecting the guide member with a sickle, and means pivotally mounting the guide housing for oscillation about the axis of the connecting means to accommodate throw of the crank.

7. In a sickle drive, a crank, a housing having angularly extending leg portions, a pitman member slidable in one of said leg portions of the housing and connected with the crank, a guide member slidably mounted in the other leg portion of the housing, a flexible connection between the pitman member and guide member, means connecting the guide member with a sickle, and means pivotally supporting the housing for oscillatory movement about the axis of said connecting means to accommodate throw of the crank.

8. In a sickle drive, a crank, a housing having angularly extending leg portions, a pitman member slidably mounted in one of said leg portions and connected with the crank, a guide member slidably mounted in the other leg portion, a flexible connection in the housing connecting the pitman member with the guide member, a rod fixed to the guide member, means rotatably connecting the rod with a sickle, and means pivotally mounting the housing for oscillation about the axis of said rod to accommodate throw of the crank.

9. In a sickle drive, a crank, a housing having angularly extending leg portions, guide ribs in the housing, a pitman member slidably mounted in one of said leg portions and having grooves engaging said ribs, means connecting the pitman member with the crank, a guide member slidably mounted in the other leg portion and having grooves engaging said guide ribs, a chain connecting the pitman member with the guide member, rollers on the chain engageable with the guide ribs, a rod fixed to the guide member, means rotatably connecting the rod with a sickle, and means pivotally mounting the housing for oscillation about the axis of said rod to accommodate throw of the crank.

10. In a sickle drive, a crank, a housing having angularly extending leg portions, guide ribs in the housing, a pitman member slidable in one of said leg portions of the housing and having grooves engaging said ribs, means connecting the pitman member with the crank, a guide member slidably mounted in the other leg portion of the housing and having grooves engaging said guide ribs, a flexible connection between the pitman member and guide member, rollers on the flexible connection engageable with the guide ribs, and means connecting the guide member with a sickle.

11. In combination with a sickle, a sickle drive including a crank, a housing having angularly extending leg portions, a pitman member slidably mounted in one of said leg portions and connected with the crank, a guide member slidably mounted in the other leg portion, a flexible connection in the housing connecting the pitman member with the guide member, a rod fixed to the guide member, a head on the sickle having a lug provided with an opening to pass the rod, ball thrust bearings on opposite sides of the lug, and means pivotally mounting the housing for oscillation about the axis of said rod to accommodate throw of the crank.

12. In combination with a sickle, a sickle drive including a crank, a housing having angularly extending leg portions, a pitman member slidably mounted in one of said leg portions and connected with the crank, a guide member slidably mounted in the other leg portion, a flexible connection in the housing connecting the pitman member with the guide member, a rod fixed to the guide member, a head on the sickle having a lug provided with an opening to pass the rod, ball thrust bearings on opposite sides of the lug, means pivotally mounting the housing for oscillation about the axis of said rod to accommodate throw of the crank, and stop nuts threaded on the rod for adjustably positioning the ball thrust bearings on said rod.

13. In combination with a sickle including a knife back and a support for the knife back, a sickle drive including a crank, a housing having angularly extending leg portions, a pitman member slidably mounted in one of the leg portions and connected with the crank, a guide member slidably mounted in the other leg portion, a flexible connection in the housing connecting the pitman member with the guide member, a rod fixed to the guide member, a head on the knife back, means oscillatably connecting the rod with said head, means pivotally mounting the housing for oscillation about the axis of said rod to accommodate throw of the crank, and guide means on the respective sides of said head for guidingly retaining the knife back for reciprocatory movement on said support.

14. In combination with a sickle including a knife back and a support for the knife back, a sickle drive including a crank, a guide housing having oscillatory mounting on the support, a pitman member slidably mounted in the guide housing and connected with the crank, flexible means in the guide housing having connection with the pitman member, a driving head on the knife back, means swively connecting the flexible means with the driving head, and means on the support at opposite sides of the driving head for guidingly retaining the knife back for reciprocatory movement on the support.

15. In combination with a sickle including a knife back and means for reciprocably supporting the knife back, means for actuating the sickle including a crank, a housing having oscillatory mounting on said supporting means, a driving head fixed to the knife back, driving connections reciprocable in the housing for connecting the crank with said head, means pivotally mounting the housing to accommodate throw of the crank, and guide means engaging the knife back on the respective sides of the driving head to retain the knife back for reciprocatory movement on said supporting means.

16. In a sickle drive, a crank, a guide housing, a pitman slidable in the guide housing and connected with the crank, a sickle supported for reciprocation in a plane intersecting the plane of operation of the crank, a driven connection in the guide housing having connection with the pitman, means connecting the driven connection with the sickle, and means pivotally mounting the guide housing for oscillation to accommodate throw of the crank.

TORVALD N. PIERSON.
GENE ALLEN.